(12) United States Patent
D'Cunha et al.

(10) Patent No.: US 7,289,342 B2
(45) Date of Patent: Oct. 30, 2007

(54) OUTPUT VOLTAGE STABILIZER FOR SWITCHING MODE POWER SUPPLY

(75) Inventors: Allwyn Jacob D'Cunha, Samutprakarn (TH); Piyaphong Bumroongsawad, Samutprakarn (TH)

(73) Assignees: Delta Electronics, Inc., Taoyuan Hsien (TW); Delta Electronics (Thailand) Public Company Limited, Sumutprakarn (TH)

( * ) Notice: Subject to any disclaimer, the term of this patent is extended or adjusted under 35 U.S.C. 154(b) by 0 days.

(21) Appl. No.: 11/417,780

(22) Filed: May 4, 2006

(65) Prior Publication Data

US 2006/0203520 A1  Sep. 14, 2006

Related U.S. Application Data

(63) Continuation of application No. 10/346,626, filed on Jan. 17, 2003, now abandoned.

(51) Int. Cl.
*H02M 3/335* (2006.01)

(52) U.S. Cl. ...................... 363/49; 363/21.08

(58) Field of Classification Search ............... 363/49, 363/21.08, 21.16, 40; 323/207; 307/103
See application file for complete search history.

(56) References Cited

U.S. PATENT DOCUMENTS

| 5,285,369 A | 2/1994 | Balakrishnan |
| 5,675,485 A | 10/1997 | Seong |
| 6,980,443 B2 * | 12/2005 | Nagano et al. ......... 363/21.12 |

* cited by examiner

*Primary Examiner*—Shawn Riley

(57) ABSTRACT

There is provided an output voltage stabilizer for stabilizing an output voltage of a switching mode power supply by elimination power bounce appearing on the output voltage of the switching mode power supply. The output voltage stabilizer mainly includes a voltage comparator that compares a rectified DC voltage obtained by the rectification of an input AC voltage with a reference voltage and in response thereto generates an output signal, and a control switch that is biased according to the output signal of the voltage comparator and provides the power supply a drive signal to stabilize an output voltage of the power supply during the brownout or soft-start stage in the input AC voltage.

11 Claims, 3 Drawing Sheets

| Pin No. | Pin Name | Function | Description |
|---|---|---|---|
| 1 | Adj | Adjust the Skipping Peak Current | This pin is used to adjust the level at which the cycle skipping process takes place |
| 2 | FB | Set the Peak Current Setpoint | By connecting an optocoupler to this pin, the peak current setpoint is adjusted according to the output power demand |
| 3 | CS | Current Sense Input | This senses the pimary current and routes it to the internal comparator via an L.E.B. |
| 4 | GND | The IC Ground | |
| 5 | Drv | Driving Pulses | The driver's output to an external MOSFET |
| 6 | VCC | Supply The IC | This pin is connected to an external bulk capacitor of typically 10µF |
| 7 | NC | No Connection | This un-connected pin ensures adequate creepage distance |
| 8 | HV | Generate the VCC from Line | Connected to the high-voltage rail, this pin injects a constant current into the VCC bulk capacitor |

Fig.3

OUTPUT VOLTAGE STABILIZER FOR SWITCHING MODE POWER SUPPLY

CROSS-REFERENCE TO RELATED APPLICATION

This application is a continuation of U.S. application Ser. No. 10/346,626, filed Jan. 17, 2003 now abandoned, which is incorporated herein by reference.

FIELD OF THE INVENTION

The present invention is generally related to a voltage stabilizer for smoothly turning on and turning off a switching mode power supply, and more particularly, the present invention is related to a voltage stabilizer that is used to stabilize the output voltage of a switching mode power supply by the elimination of power bounce appearing on the output voltage of a power supply.

BACKGROUND OF THE INVENTION

A power supply is generally used to convert commercially available alternating current power to direct current power for use by an ordinary electronic appliance. The conversion technique used in a power supply for a personal computer is based on the switching operation of switching devices to provide DC output voltage of multiple predetermined levels. This type of power supply is generally termed as switching regulator or switching mode power supply (SMPS).

However, the implication of power quality of a switching mode power supply always depends on its capability to exclude abrupt disturbance or maintain power conversion efficiency. A common problem that would cause the instability of the power quality of a power supply is due to voltage sag or voltage dip that is caused by an accident occurring between adjacent feed lines or voltage buses. The voltage sag generally means that the root-mean-square value (rms value) of voltage is dropped below its nominal value by 10% to 90%, and it would last for a prolonged period, for example, several seconds. The generation of voltage sag in an AC power source would greatly lessen the reliability of a power supply.

In a power supply system, brownout condition signifies a significant degradation of the primary power source. The danger of brownout condition is that it can repeat several times consecutively and is generally followed by a follow-on surge that can be several times of the voltage that a switching mode power supply is supposed to take in. It has been discovered in numerous brownout tests for switching mode power supply that in case the input voltage is abruptly dropped below its nominal value by about 50%, the output voltage is still under regulation. However, in case the input voltage is abruptly dropped below its nominal value by 80%, the output voltage will run out of regulation and start to bounce violently. The unstable output voltage generated by the power supply is likely to damage other electronic circuit powered by the power supply.

In addition to the brownout problem that is induced as the input voltage abruptly dropped below its nominal value by a predetermined amount, when the power supply is started up, a surge current may be induced at the input terminals of the power supply. Therefore the output voltage of power supply may overshoot upon start-up and sparks may generated. To limit the current surge from the input terminals of power supply upon start-up and provide a simple way to softly start the power supply, a device featuring with soft-start function is required to ensure a soft start-up of the power supply.

In view of foregoing problems, what is needed is an output voltage stabilizer that can stabilize the output voltage of power supply during brownout stage and/or soft-start process. The present invention can satisfy these needs.

SUMMARY OF THE INVENTION

A first object of the present invention is to provide an output voltage stabilizer for a switching mode power supply that can limit the output voltage from bounce when an abrupt voltage sag is occurred to the input AC power of the power supply.

A second object of the present invention is to provide an output voltage stabilizer for a switching mode power supply that enable the switching mode power supply to turn on smoothly.

Specifically, the present invention contrives an output voltage stabilizer for a switching mode power supply, comprising a voltage comparator that compares a DC voltage with a reference voltage and in response thereto generates an output signal, and a control switch that is biased according to the output signal of the voltage comparator and provides the switching mode power supply a drive signal to stabilize an output voltage of the switching mode power supply according to an on/off state of the control switch.

In a boarder aspect of the present invention, a switching mode power supply is disclosed which is comprised of a rectifier for converting AC power received from an AC power source into rectified DC power, a switching transformer coupled to the rectifier and including a primary winding and a secondary winding for receiving the rectified DC power and generating AC voltage across the secondary winding through the primary winding, a switching device coupled to the primary winding of the switching transformer for converting a rectified DC power into AC power by on/off operations, an output portion coupled to the secondary winding of the switching transformer for providing an output voltage of a predetermined value, a switching control circuit which outputs switching control pulse signals to control on/off operations of the switching device, and an output voltage stabilizer coupled between the rectifier and the switching control circuit which compares the rectified direct current power generated by the rectifier with a reference voltage and in response thereto provides a drive signal to drive the switching control circuit to stabilize the output voltage of power supply.

The features and advantages of the present invention will become apparent through the following descriptions with reference to the drawings presented herein, in which:

BRIEF DESCRIPTION OF THE DRAWINGS

FIG. 3 is a compilation of pin function description of NCP1200 PWM current-mode controller manufactured by On Semiconductor Corporation.

DETAILED DESCRIPTION OF THE PREFERRED EMBODIMENT

The exemplary embodiments of the present invention will now be described in detail with reference to the following preferred embodiments. However, it is to be noted that various modifications can be made on the basis of the present invention, without departing from the spirit and scope of the present invention as to be encompassed within the present invention.

Figure 1:
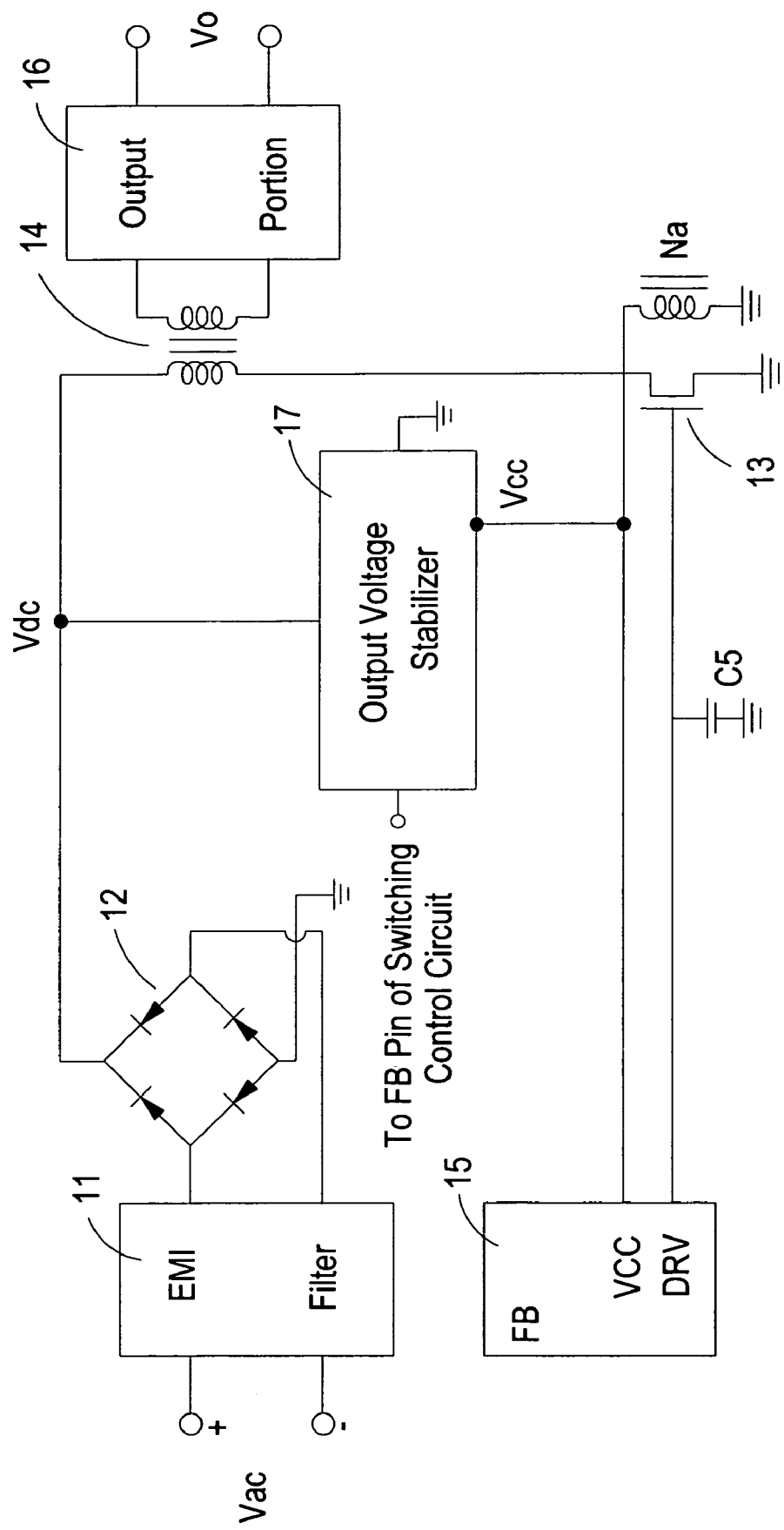
FIG. 1 is a circuit diagram showing a switching mode power supply in conjunction with the output voltage stabilizer incorporated therein in accordance with the present invention.

The best mode for carrying out the present invention is depicted as follows. FIG. 1 shows the circuit topology of the switching mode power supply according to an embodiment of the present invention. As shown in FIG. 1, reference numeral 11 denotes an EMI filter that attenuates noise signals appearing between power lines extending from an AC power source, a reference numeral 12 denotes a full-wave rectifier that rectifies the input AC voltage Vac into a DC voltage Vdc, a reference numeral 13 denotes a switching device such as a power MOSFET that applies the DC voltage Vdc from the full-wave rectifier 12 to the primary winding side of a switching transformer 14 to generate a high-frequency AC power therein, a reference numeral 14 denotes a switching transformer which generates AC voltage across its secondary winding as the switch device 13 turns on and off, a reference numeral 15 denotes a switching control circuit for outputting switching control pulse signals from driving pulse pin (DRV pin) to control the on/off operations of the switch device 13, a reference numeral 16 denotes an output portion for providing a DC output voltage Vo at output terminals. In addition, the switching transformer 14 includes an auxiliary winding Na that provides supply power for the switching control circuit 15 through the voltage supply pin VCC of the switching control circuit 15.

The switching control circuit 15 may use NCP1200 PWM current-mode controller manufactured by On Semiconductor Corporation, and a compilation of its pin function description is tabulated in FIG. 3 for reference.

Figure 2:
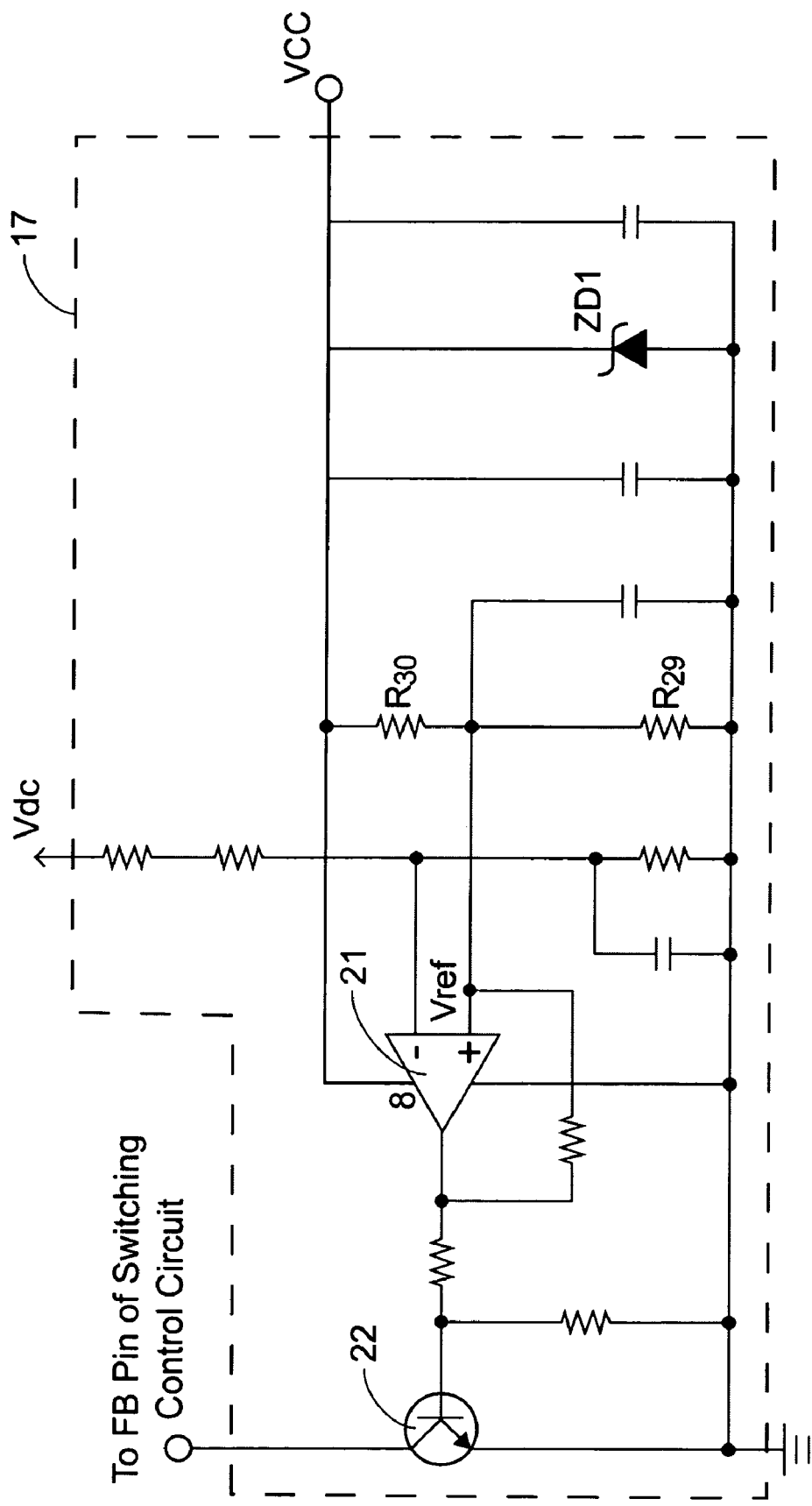
FIG. 2 shows the detailed circuitry of the output voltage stabilizer in accordance with the present invention.

Still referring to FIG. 1, the feature of the present invention is highlighted by an output voltage stabilizer 17. As shown in FIG. 1, an output voltage stabilizer 17 is incorporated in the switching mode power supply and coupled between an output of the rectifier 12 and a feedback pin (FB pin) of the switching control circuit 15. The main purpose of the incorporation of output voltage stabilizer 17 in a switching mode power supply is to drive the feedback pin of the switching control circuit 15 to a logic state so as to regulate the output voltage Vo without bounce, if the input AC voltage Vac is undergoing a voltage sag process or is experiencing an initiation process. Referring to FIG. 2, a detailed circuitry that looks inside the output voltage stabilizer 17 is shown. The output voltage stabilizer 17 according to the exemplary embodiment of the present invention principally consists of a voltage comparator 21 that compares the DC component Vdc of the input AC voltage Vac generated by the full-wave rectifier 12 with a reference signal Vref and generates an output signal of a comparison result provided therein, and a control switch 22 such as a bipolar junction transistor (BJT) switch which receives the output signal from the voltage comparator 21 and responsive to the output signal of the voltage comparator 21 to output a drive signal to drive the feedback pin of the switching control circuit 15.

More preferably, the voltage comparator 21 may use LM358 single-supply dual-operational amplifier, also manufactured by On Semiconductor Corporation.

The operation of the output voltage stabilizer 17 according to the present invention will be explained as follows in reference to FIGS. 1, 2 and 3.

Assume that the input AC voltage Vac slowly increases from 0 Vac, the DC component Vdc of input AC voltage Vac generated by the full-wave rectifier 12 will increase as well. Also, the auxiliary winding Na of the switching transformer 14 starts to release supply voltage to the switching control circuit 15 through voltage supply pin VCC. The voltage supply pin VCC for the switching control circuit 15 also applies to the eighth pin of the voltage comparator 21 of the output voltage stabilizer 17. Moreover, the reference voltage Vref used in the voltage comparator 21 is generated by dividing the supply voltage VCC by a fraction determined by the voltage divider R29, R30.

When the supply voltage Vcc is higher than the voltage of the zener diode ZD1, the reference voltage Vref applied to the non-inverting input terminal of the voltage comparator 21 will become stable. At this moment, the reference voltage Vref applied to the non-inverting input terminal of the voltage comparator 21 is higher than the voltage applied to the inverting input terminal of the voltage comparator 21, so that the voltage comparator sends an output signal with a logic high state to the base terminal of the BJT switch 22. The BJT switch 22 will then be biased to turn on, and thus send a drive signal to the feedback pin of the switching control circuit 15 to conduct the feedback pin of the switching control circuit 15 to ground. When the input AC voltage Vac increases to reach the point that voltage applied to the inverting input terminal of the voltage comparator 21 is higher than that applied to the non-inverting input terminal, the logic state of the output signal of the voltage comparator 21 becomes low and the BJT switch is biased to turn off. At this moment the state of feedback pin of the switching control circuit 15 becomes high and the switching control circuit 15 starts to output switching control pulse signals through drive pulse pin DRV to drive switch device 13. In the mean time, the output voltage of the power supply start to rise up and is regulated without bounce.

In a second aspect of the present invention, a brownout test is performed to the switching mode power supply of the present invention. Under brownout condition, the input AC voltage Vac is dropped. When Vac is continuously dropped down to the level that the voltage applied to the inverting input terminal of the voltage comparator 21 is lower than that applied to the non-inverting input terminal of the voltage comparator 21, the state of the output signal of voltage comparator 21 goes high and the BJT switch 22 is biased to turn on. The feedback pin of the switching control circuit 15 will be conducted to ground again to shutdown the switching control circuit 15. At this moment the output voltage Vo will drop to 0V without bounce.

According to the above statements, the use of the output voltage stabilizer 17 in a switching mode power supply is to clamp the state of the feedback pin of switching control controller 15 to a low state when the input AC voltage Vac is within a certain range of voltage level, so as to ensure a complete transfer of energy from the primary side of switching transformer 14 to the output portion 16 circuit located at the secondary side of the switching transformer 14 with the introduction of the output voltage stabilizer of the present invention into the switching mode power supply, the signal bounce occurring to the output voltage of the power supply can be eliminated, and thus a stable output voltage can be attained without effort.

It is clear in virtue of the above descriptions that the basic principle of the present invention is to use an output voltage stabilizer to clamp the voltage level of feedback pin of switching control circuit to a low state when the input AC voltage Vac is within a certain range, such that a complete transfer of energy from the primary side of switching transformer 14 to the output portion 16 can be ensured and the output voltage can be stabilized. Whether the switching mode power supply is under either brownout condition or start-up condition, its output voltage can be stabilized by controlling the feedback amount that is transferred to the switching control circuit.

Although the invention has been described and illustrated in detail, it is to be clearly understood that the same is by the way of illustration and example only and is not to be taken by way of limitation, the spirit and scope of the present invention being limited only by the terms of the appended claims.

What is claimed is:

1. An output voltage stabilizer for a power supply that includes a switching control circuit and a rectifier that converts an input alternating current voltage into a direct current voltage, comprising:
   a voltage comparator configured to receive the direct current voltage from the rectifier, compare the direct current voltage with a reference voltage to detect a brownout or soft-start stage in the input alternating current voltage, and in response thereto generate an output signal, and wherein the direct current voltage received from the rectifier is the DC component of the input alternating current voltage; and
   a control switch coupled with the voltage comparator, biased according to said output signal and configured to provide a drive signal to the switching control circuit to stabilize an output voltage of said power supply during said brownout or soft-start stage.

2. The output voltage stabilizer as claimed in claim 1 wherein said voltage comparator comprises a dual-operational amplifier.

3. The output voltage stabilizer as claimed in claim 1 wherein said control switch comprises a bipolar junction transistor.

4. A power supply comprising:
   a rectifier configured to convert an input alternating current power received from an alternating current power source into a direct current power;
   a switching transformer coupled with said rectifier and including a primary winding and a secondary winding for receiving said direct current power and generating an alternating current voltage across said secondary winding through said primary winding;
   a switching device coupled with said primary winding of said switching transformer for converting a rectified direct current power into an alternating current power by on/off operations;
   an output portion coupled to said secondary winding and configured to provide an output voltage having a predetermined value;
   a switching control circuit configured to output switching control pulse signals to control said on/off operations of said switching device; and
   an output voltage stabilizer coupled with said rectifier and said switching control circuit, configured to compare said direct current power which is the DC component of the input alternating current power with a reference voltage to detect a brownout or soft-start stage in said alternating current power, and in response thereto provide a drive signal to drive said switching control circuit to stabilize said output voltage during the brownout or soft-start stage.

5. The power supply as claimed in claim 4 further comprising an electromagnetic interference filter coupled to said rectifier for reducing noise signal appearing between power lines extending from an alternating current power source.

6. The power supply as claimed in claim 4 wherein said switching transformer further comprises an auxiliary winding.

7. The power supply as claimed in claim 6 wherein said switching control circuit is powered through said auxiliary winding of said switching transformer.

8. The power supply as claimed in claim 4 wherein said switch device comprises a power MOSFET.

9. The power supply as claimed in claim 4 wherein said output voltage stabilizer further comprises:
   a voltage comparator configured to receive a direct current voltage from the rectifier, compare the direct current voltage with a reference voltage to detect a brownout or soft-start stage in the input alternating current power, and in response thereto generate an output signal; and
   a control switch coupled with the voltage comparator, biased according to said output signal and configured to provide a drive signal to the switching control circuit to stabilize an output voltage of said power supply during said brownout or soft-start stage.

10. The power supply as claimed in claim 9 wherein said voltage comparator comprises a dual-operational amplifier.

11. The power supply as claimed in claim 9 wherein said control switch comprises a bipolar junction transistor.

* * * * *